US010861188B2

(12) United States Patent
Fukui

(10) Patent No.: US 10,861,188 B2
(45) Date of Patent: Dec. 8, 2020

(54) IMAGE PROCESSING APPARATUS, MEDIUM, AND METHOD

(71) Applicant: CANON KABUSHIKI KAISHA, Tokyo (JP)

(72) Inventor: Yuiko Fukui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 16/117,565

(22) Filed: Aug. 30, 2018

(65) Prior Publication Data
US 2019/0080477 A1 Mar. 14, 2019

(30) Foreign Application Priority Data

Sep. 8, 2017 (JP) ................................. 2017-173220

(51) Int. Cl.
*G06T 7/80* (2017.01)
*H04N 5/445* (2011.01)
(Continued)

(52) U.S. Cl.
CPC .............. *G06T 7/80* (2017.01); *G06T 3/4038* (2013.01); *G06T 7/74* (2017.01); *H04N 5/2252* (2013.01);
(Continued)

(58) Field of Classification Search
CPC ........... G06T 7/80; G06T 7/74; G06T 3/4038; G06T 2207/30168; G08B 13/19643; H04N 5/2252; H04N 5/247; H04N 5/23206; H04N 5/23299; H04N 5/23238; H04N 5/4405; H04N 5/445; H04N 5/265; H04N 5/2624
(Continued)

(56) References Cited

U.S. PATENT DOCUMENTS 9,215,358 B2 12/2015 Sablak
2003/0071891 A1 4/2003 Geng
(Continued)

FOREIGN PATENT DOCUMENTS

CN 102577347 A 7/2012
CN 102857739 A 1/2013
(Continued)

OTHER PUBLICATIONS

Amjadi, Faezeh, et al., "Comparison of Radial and Tangential Geometries for Cylindrical Program", 2016 Fourth International Conference on 3D Vision, 2016, pp. 649-657.
(Continued)

*Primary Examiner* — Allen C Wong
(74) *Attorney, Agent, or Firm* — Venable LLP

(57) ABSTRACT

An image processing apparatus includes a first acquisition unit configured to acquire a first image that is obtained by synthesizing a plurality of images captured by a plurality of first image capturing units that respectively capture a monitoring region, a second acquisition unit configured to acquire a second image that is obtained by a plurality of images captured by a second image capturing unit that captures the monitoring region by turning the second image capturing unit in a tilt direction and in a pan direction, and an output unit configured to output information indicating a region that cannot be captured by the plurality of first acquisition units, based on the first image and the second image.

13 Claims, 13 Drawing Sheets

(51) Int. Cl.
  *H04N 5/232*    (2006.01)
  *G06T 7/73*     (2017.01)
  *G06T 3/40*     (2006.01)
  *H04N 5/247*    (2006.01)
  *H04N 5/225*    (2006.01)
  *H04N 21/422*   (2011.01)
  *G08B 13/196*   (2006.01)

(52) U.S. Cl.
  CPC ..... *H04N 5/23206* (2013.01); *H04N 5/23238* (2013.01); *H04N 5/23299* (2018.08); *H04N 5/247* (2013.01); *H04N 5/445* (2013.01); *H04N 21/42204* (2013.01); *G06T 2207/30168* (2013.01); *G08B 13/19643* (2013.01)

(58) Field of Classification Search
  USPC .......................................................... 348/36
  See application file for complete search history.

(56) References Cited

U.S. PATENT DOCUMENTS

| | | | | |
|---|---|---|---|---|
| 2005/0099500 | A1* | 5/2005 | Fujita | H04N 21/440245 |
| | | | | 348/207.99 |
| 2012/0169842 | A1* | 7/2012 | Chuang | G08B 13/19619 |
| | | | | 348/39 |
| 2012/0274776 | A1 | 11/2012 | Gupta et al. | |
| 2016/0127657 | A1 | 5/2016 | Mukai et al. | |
| 2016/0210787 | A1* | 7/2016 | Chu | G06T 19/006 |
| 2017/0026680 | A1 | 1/2017 | Sugio et al. | |

FOREIGN PATENT DOCUMENTS

| | | | | |
|---|---|---|---|---|
| CN | 103167234 A | 6/2013 | | |
| CN | 103338343 A | 10/2013 | | |
| CN | 104483983 A | 4/2015 | | |
| CN | 105165004 A | 12/2015 | | |
| EP | 1579399 B1 * | 7/2007 | ....... | G08B 13/19643 |
| EP | 2 607 951 A1 | 6/2013 | | |
| JP | 2015-204512 A | 11/2015 | | |

OTHER PUBLICATIONS

Extended Search Report dated Jan. 7, 2019, issued in corresponding European Patent Application No. 18187947.9.

Chinese Office Action dated Jul. 14, 2020, issued in corresponding Chinese Patent Application No. 201811042874.8.

* cited by examiner

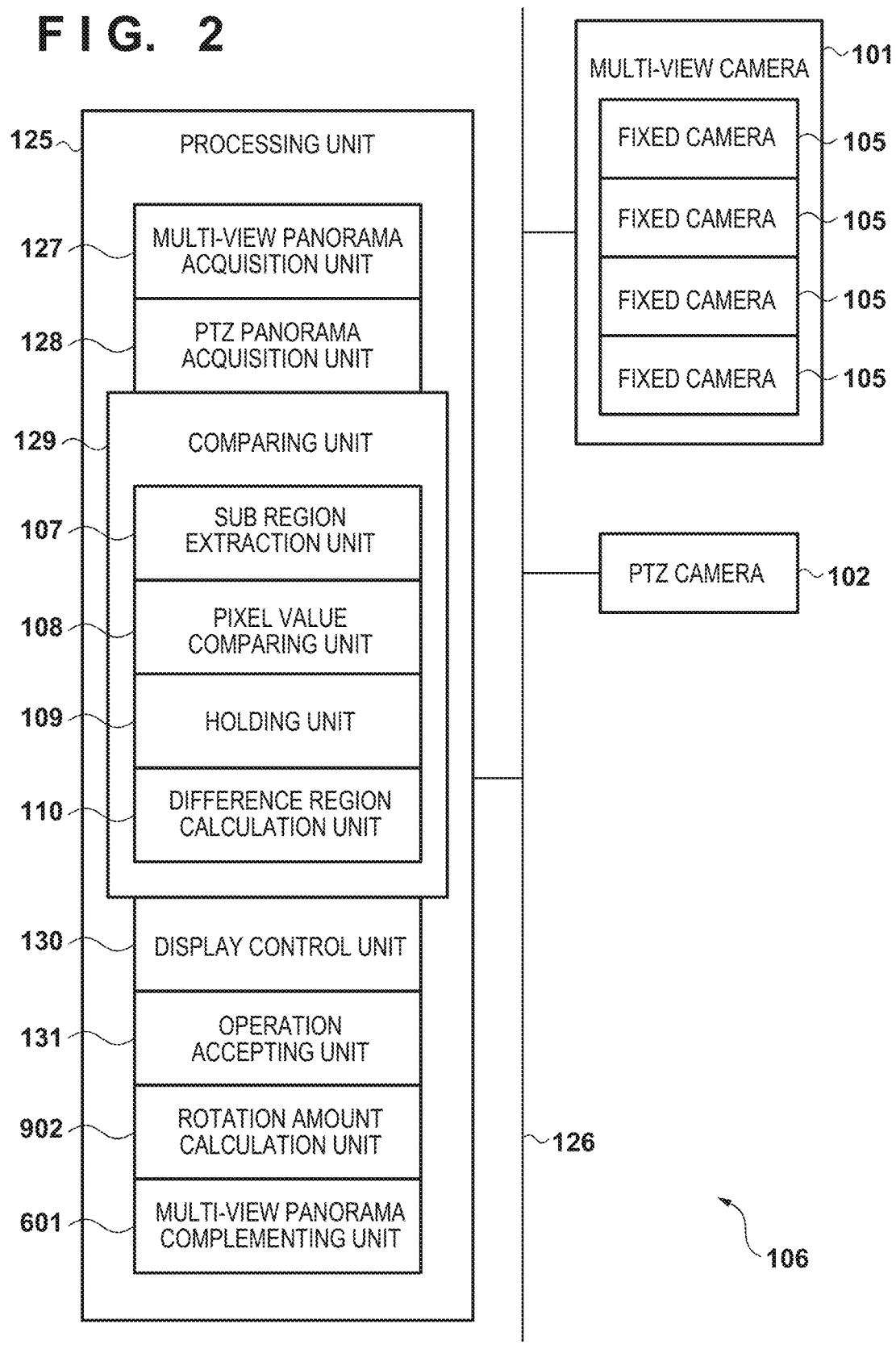

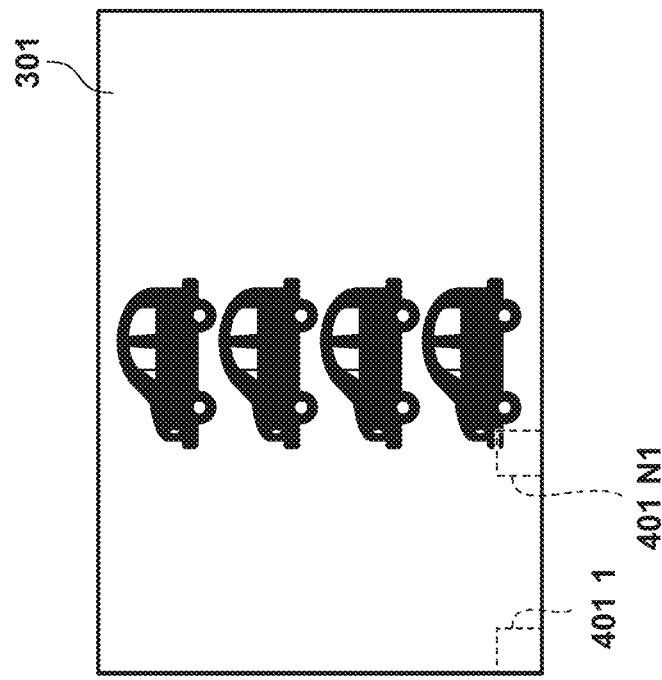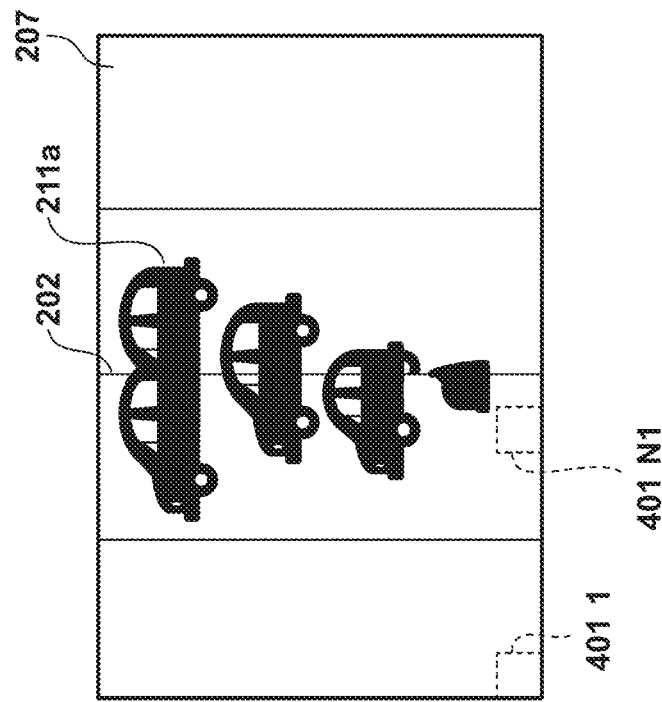

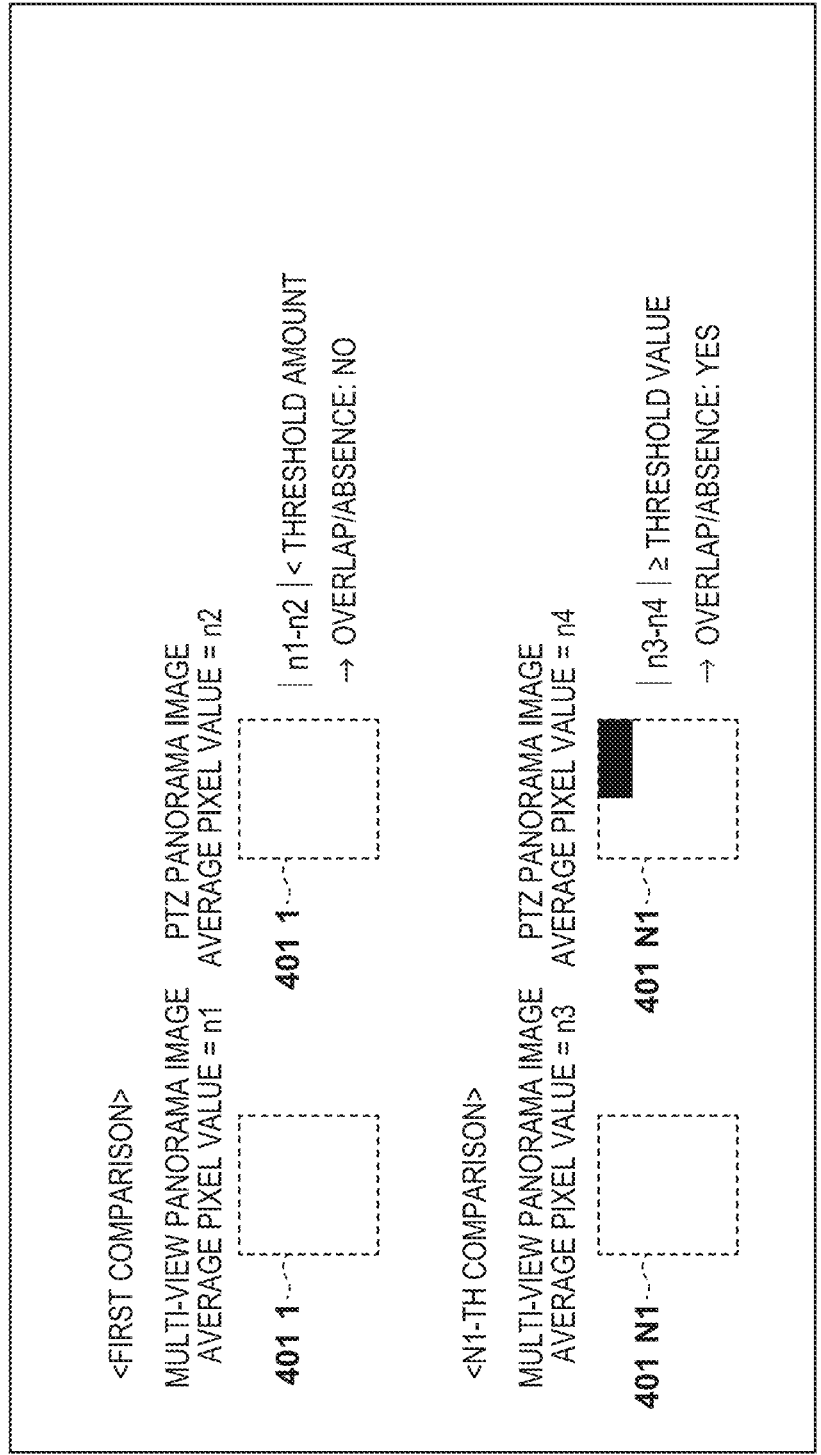

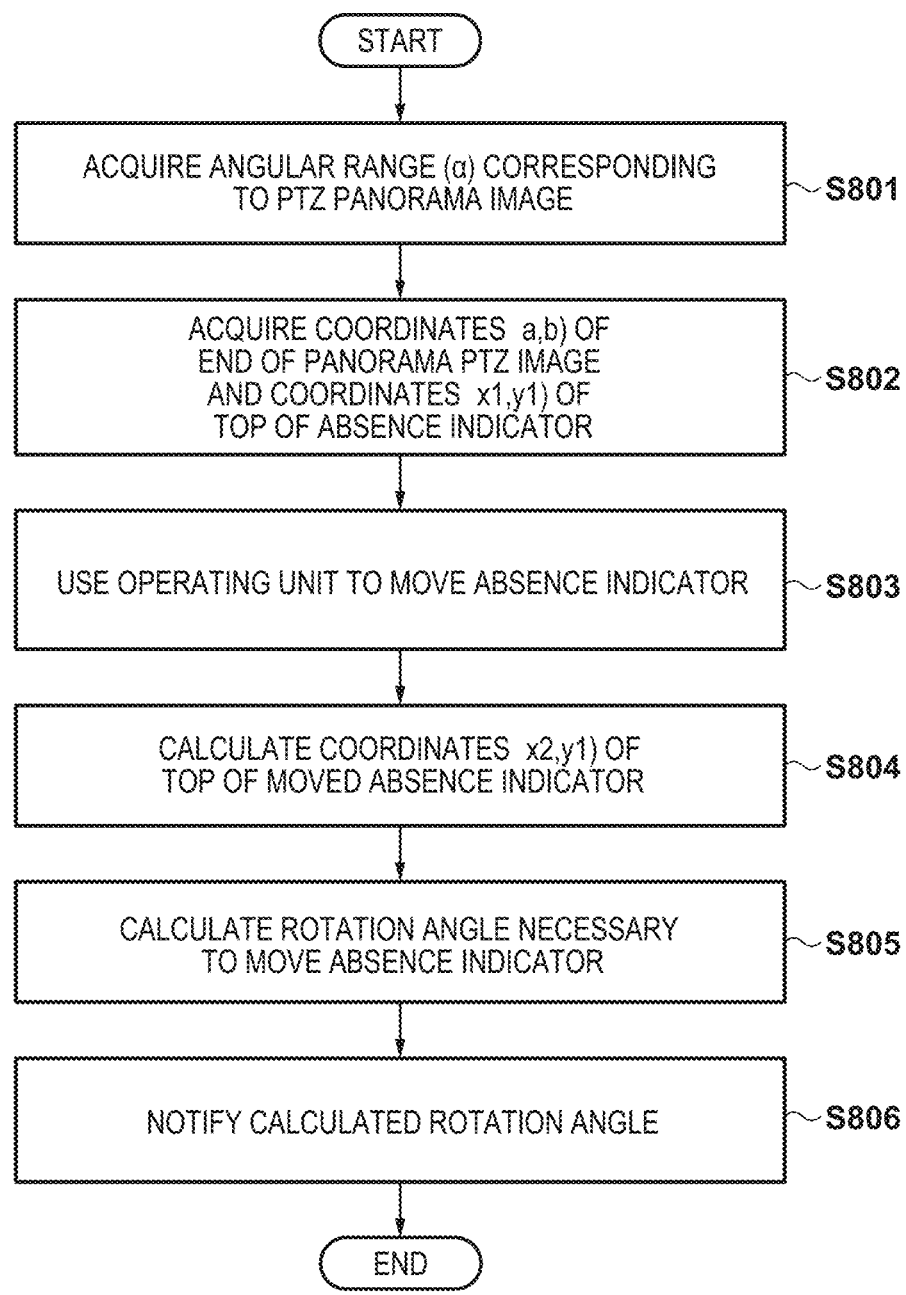

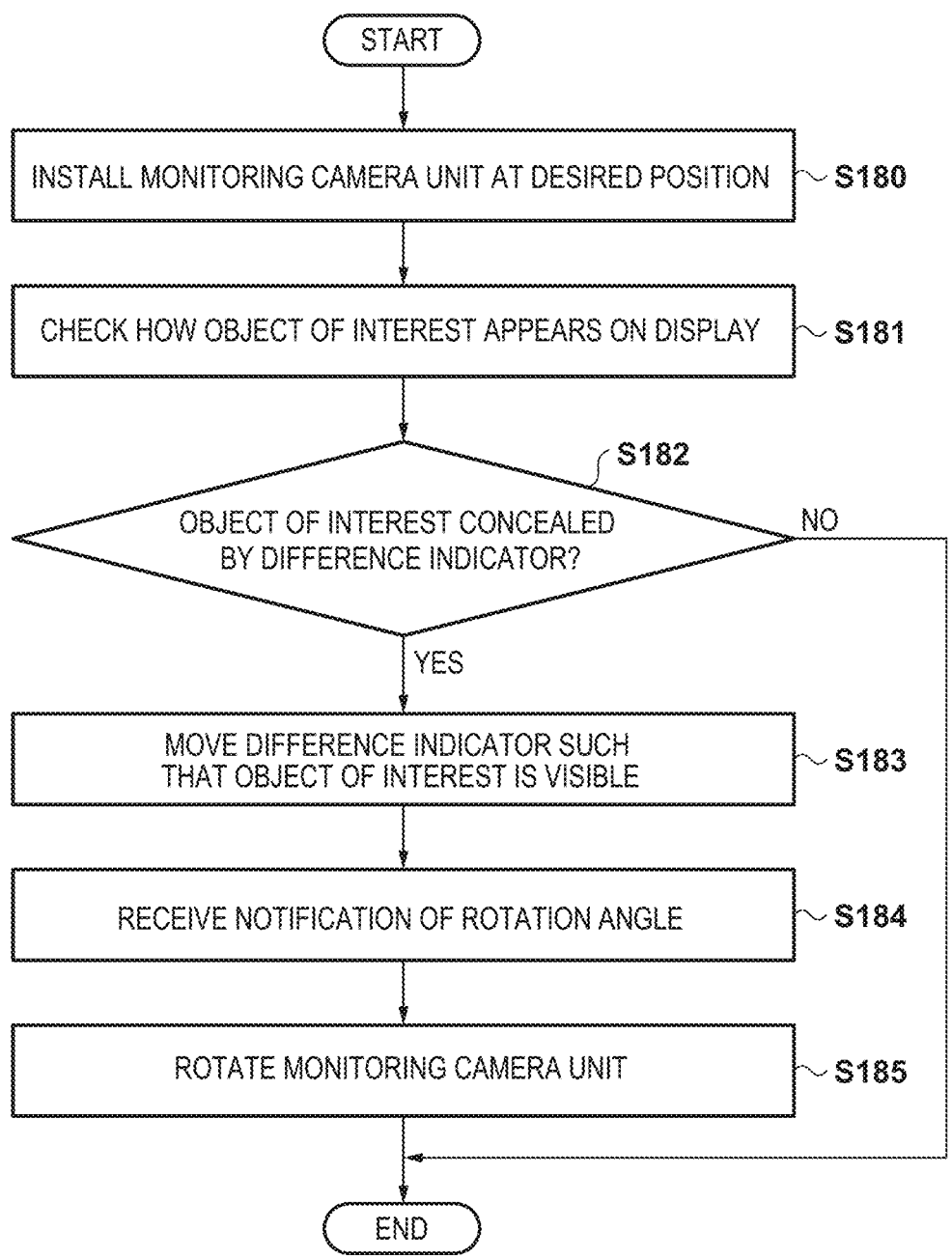

IMAGE PROCESSING APPARATUS, MEDIUM, AND METHOD

BACKGROUND

This application claims the benefit of Japanese Patent Application No. 2017-173220, filed Sep. 8, 2017, which is hereby incorporated by reference herein in its entirety.

FIELD OF THE INVENTION

The present invention relates to an image processing apparatus, a medium, and a method.

DESCRIPTION OF THE RELATED ART

Conventionally, there are image pickup apparatuses that include multiple image-capturing units capable of generating a synthesized image, and also, an image-capturing unit capable of wide-range photography. It is possible to realize wide-range monitoring by generating a synthesized image from the plurality of image-capturing units, and also using an image from the image-capturing unit capable of wide range photography to check details that cannot be recognized in the synthesized image.

However, due to the arrangement configuration of the image-capturing units, there are cases when a region having a double image or a region having an absence appears in the synthesis joining portions. Depending on the position of the photographic subject, there may be cases in which subject duplication or absence occurs, and proper shooting of the photographic subject is not possible. Hereafter, regions having double images and regions having an absence will collectively be referred to as overlap/absence regions.

As a response to the above problem, there is a method of compensating for the overlap or absence with a different image-capturing apparatus. For example, Japanese Patent Laid-Open No. 2015-204512 discloses a method of detecting absence regions in a monitoring system configured by a large number of cameras, and issuing movement instructions to movable cameras so as to prevent the absence regions.

SUMMARY

However, in cases in which the number of moveable cameras is less than the number of absence regions, it is not possible to always appropriately perform image-capturing for all of the absence regions with the technology disclosed in Japanese Patent Laid-Open No. 2015-204512. Also, although it is possible to detect absence regions with the technology disclosed in Japanese Patent Laid-Open No. 2015-204512, it is not possible to grasp the positions of the absence regions.

An aspect of the present invention provides an image processing technique that is able to more appropriately deal with overlap/absence regions.

An aspect of the present invention has the configuration below.

An image processing apparatus includes a first acquisition unit configured to acquire a synthesized image that is obtained by synthesizing a plurality of images from a plurality of first image-capturing units that are directed to a predetermined region, a second acquisition unit configured to acquire a reference image from a second image-capturing unit that is directed to the predetermined region, a comparing unit configured to compare the synthesized image and the reference image, and an output unit configured to output a comparison result from the comparing unit.

According to the above aspect of the present invention, an image processing technique that is able to more appropriately deal with overlap/absence regions can be provided.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a block diagram showing a configuration and functions of a monitoring camera unit of FIG. 1.

FIG. 4A is a diagram showing a multi-view panorama image in a case in which a pickup region is picked up by a multi-view camera.

FIG. 4B is a diagram showing a pan/tilt/zoom (PTZ) panorama image in a case in which the same pickup region is picked up by a PTZ camera.

FIG. 4C is an illustrative diagram that shows a method of determining an overlap portion and an absence portion.

FIG. 8 is a flowchart showing a flow of a series of processing in a rotation amount calculation unit in FIG. 2.

FIG. 11 is a flowchart showing a procedure in a case in which an installer adjusts the orientation of a monitoring camera unit.

DESCRIPTION OF THE EMBODIMENTS

Hereafter, identical or equivalent constituent elements, members, and processing shown in the figures will be assigned the same reference signs, and redundant descriptions will be omitted as appropriate. Also, some members not crucial to the description will not be shown in the figures.

The following embodiment provides an image processing apparatus that supports the desired installation of a monitoring camera unit that includes a plurality of fixed cameras and a PTZ camera capable of generating a wide-range image. This image processing apparatus acquires a synthesized image obtained by synthesizing a plurality of images from the plurality of fixed cameras, acquires a wide-range image (hereafter referred to as a reference image) from the PTZ camera, calculates the difference between the display range of the acquired synthesized image and the display range of the reference image, and displays the reference image together with an indicator that shows the calculated difference on a display. Through this, it becomes easier to grasp an overlap region and an absence region of a synthesized image, and it is possible to easily realize the adjustment of the orientation and the installation position of the monitoring camera with consideration given to the position of a photographic subject and the positions of the overlap/absence regions.

Figure 1:
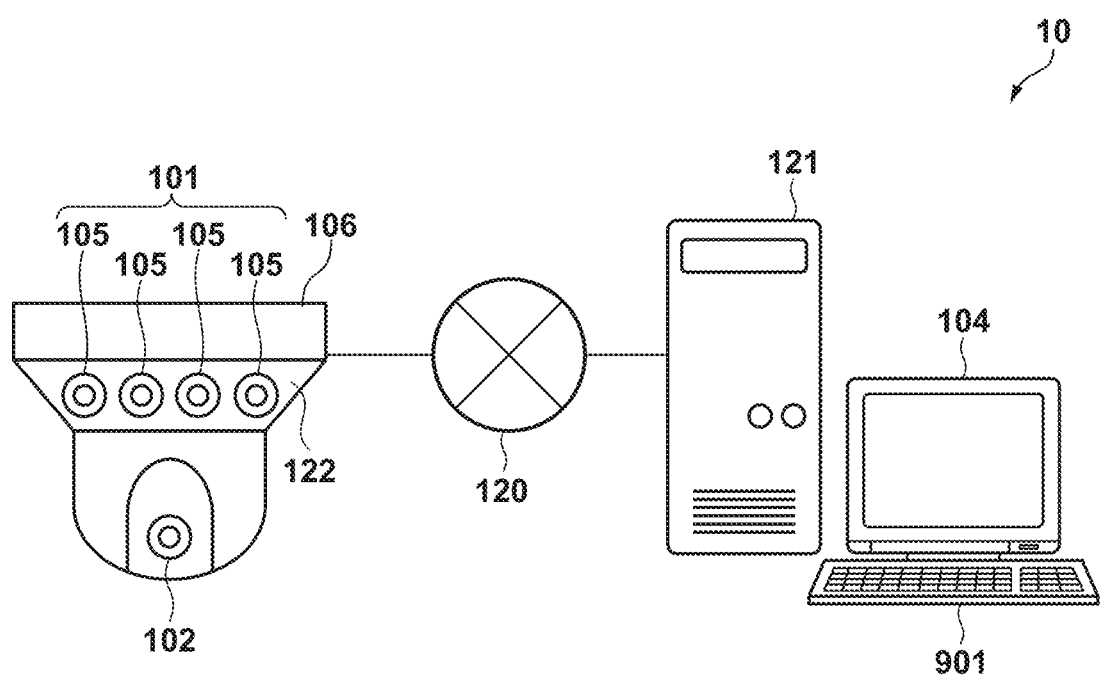
FIG. 1 is a schematic diagram of a network camera system according to an embodiment.

FIG. 1 is a schematic diagram of a network camera system 10 according to the embodiment. The network camera system 10 includes a monitoring camera unit 106 and a workstation 121. The monitoring camera unit 106 and the workstation 121 are connected via a network 120. The network 120 may be the Internet, an intranet, a LAN, a WAN, a Wi-Fi network, a public telephone network, a dedicated line, wiring, or any combination thereof, and may be a wired network or a wireless network. The workstation 121 is a management apparatus for managing the monitoring camera unit 106 via the network 120. The workstation 121 is provided with a display 104 (for example, a display means such as an LCD or an organic electroluminescent (EL) panel) and an operating unit 901. The operating unit 901 accepts user operations. The operating unit 901 may include, for example, a keyboard, a mouse, a button, or a touch panel, and may be a known apparatus that accepts voice input. The monitoring camera unit receives instructions given to the operating unit 901 via the network 120. Note that, at least one of the display 104 and the operating unit 901 may be provided on the monitoring camera unit 106.

The monitoring camera unit 106 includes a multi-view camera 101 and a PTZ camera 102. The multi-view camera 101 includes a plurality of (four in the present embodiment) fixed cameras 105. Both of the multi-view camera 101 and the PTZ camera 102 are provided in a housing 122 of the monitoring camera unit 106. Each of the four fixed cameras 105 included in the multi-view camera 101 is fixed in the housing 122. The fixed cameras 105 may have a zoom function. The PTZ camera 102 is configured to be moveable relative to the housing 122, and may, for example, have commonly known pan/tilt/zoom functions.

When the monitoring camera unit 106 is used, the multi-view camera 101 and the PTZ camera 102 are directed to the same region of a real space (hereafter referred to as a pickup region). The multi-view camera 101 picks up the pickup region with the four fixed cameras 105, synthesizes the four obtained images, and outputs a synthesized image obtained as a result of synthesis, that is, a multi-view panorama image. The PTZ camera 102 uses a pan/tilt/zoom function to pick up the pickup region, and outputs the obtained reference image, that is, a PTZ panorama image.

In the present embodiment, when the monitoring camera unit 106 is installed and its orientation (for example, an angle that is represented by an azimuth) is adjusted, the difference between the PTZ panorama image and the multi-view panorama image is displayed on the display 104. The installer can reference that indicator and adjust the direction of the monitoring camera unit 106 such that a subject of interest within the pickup region deviates from the difference regions.

FIG. 2 is a block diagram showing the configuration and the functions of the monitoring camera unit 106 according to the present embodiment. The blocks shown here can be realized by hardware, that is to say, by a mechanical device or an element such as a CPU of a computer, and can be realized by software, that is to say, by a computer program, or the like, but the function blocks shown here are realized by cooperation between hardware and software. Accordingly, the fact that these function blocks can be realized in a variety of different ways by combinations of hardware and software would be understood by a person skilled in the art reading this description.

The monitoring camera unit 106 further includes a processing unit 125. The members of the monitoring camera unit 106, that is, the multi-view camera 101, the PTZ camera 102, and the processing unit 125, are each connected to a bus 126, and are configured to be capable of mutual communication via the bus 126. The monitoring camera unit 106 may include a volatile memory or a nonvolatile memory, such as a ROM, a RAM or an HDD (none of which are shown).

Note that the present embodiment describes a case in which the processing unit 125, an operation accepting unit 131, a rotation amount calculation unit 902, and a multi-view panorama complementing unit 601 are all provided in the monitoring camera unit 106, but is not limited to this. For example, at least one of the processing unit 125, the operation accepting unit 131, the rotation amount calculation unit 902, and the multi-view panorama complementing unit 601 may be provided in the workstation 121. In the case in which the processing unit 125 is provided in the workstation 121, the monitoring camera unit transmits an image from a camera to the workstation 121 via the network 120, and receives difference information from the workstation 121 via the network 120.

The processing unit 125 includes a multi-view panorama acquisition unit 127, a PTZ panorama acquisition unit 128, a comparing unit 129, a display control unit 130, an operation accepting unit 131, the rotation amount calculation unit 902, and a multi-view panorama complementing unit 601.

The multi-view panorama acquisition unit 127 acquires a multi-view panorama image, which is obtained through synthesis of four images from the four fixed cameras 105 directed to the pickup region, from the multi-view camera 101 via the bus 126.

The PTZ panorama acquisition unit 128 acquires a PTZ panorama image, which is from the PTZ camera 102 that is directed to the pickup region, from the PTZ camera 102 via the bus 126.

The comparing unit 129 compares the multi-view panorama image acquired by the multi-view panorama acquisition unit 127 and the PTZ panorama image acquired by the PTZ panorama acquisition unit 128. For example, the comparing unit 129 identifies differences between the multi-view panorama image and the PTZ panorama image. The pickup region has blind regions, which are the blind spots of the multi-view camera 101, and overlap regions, which have been redundantly picked up by the multi-view camera 101. The differences identified by the comparing unit 129 correspond to the blind regions and the overlap regions.

Figure 3B:
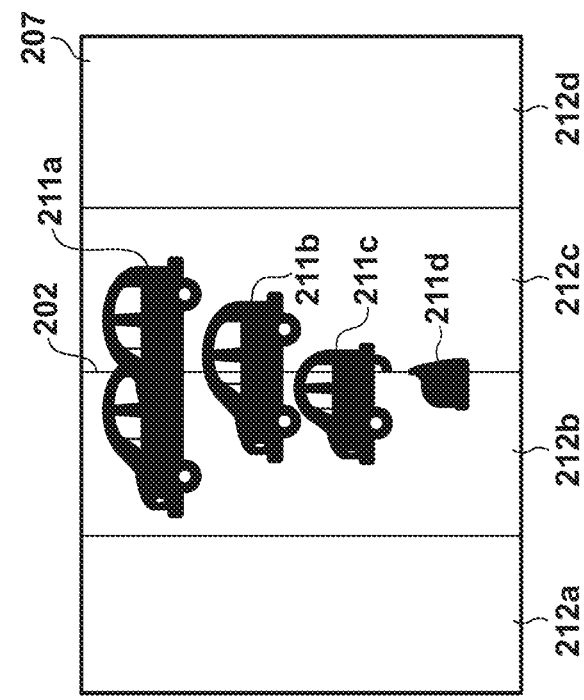
FIG. 3B is a schematic diagram of photographic subjects picked up by a monitoring camera unit.
Figure 3C:
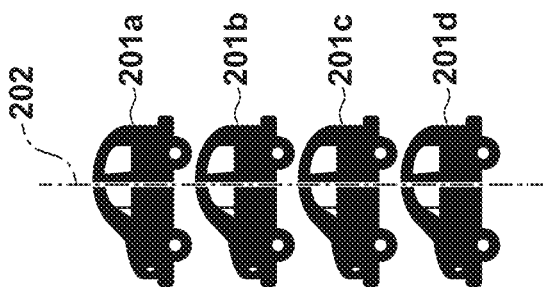
FIG. 3C is a diagram showing a multi-view panorama image in a case in which a pickup region is picked up by a multi-view camera.
Figure 3A:
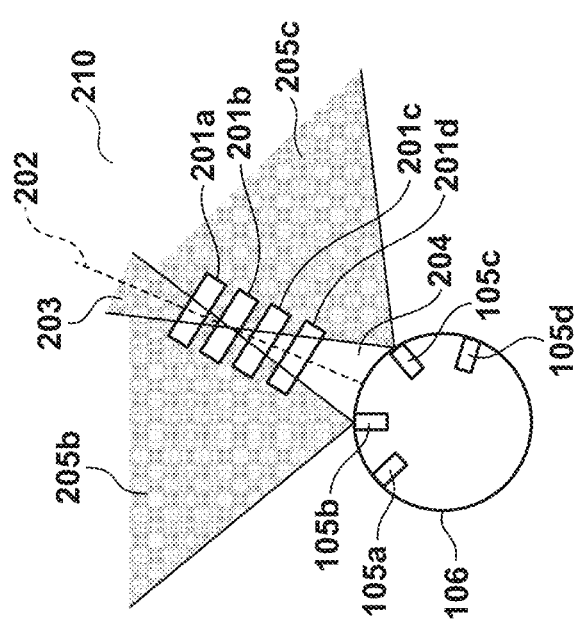
FIG. 3A is a schematic diagram showing the positional relationship between the angles of view of fixed cameras and photographic subjects.

The following describes the difference between a multi-view panorama image and a PTZ panorama image with reference to FIGS. 3A to 3C. FIG. 3A is a schematic diagram showing the positional relationship between the angles of view of fixed cameras 105a to 105d and photographic subjects 201a to 201d. FIG. 3A corresponds to a diagram of the monitoring camera unit 106 as viewed from above. The individual pickup regions in the angles of view of the fixed cameras 105a to 105d are parts of the entirety of a pickup region 210. Note that, in the present embodiment, depth, and the like, are ignored in order to make the descriptions easier to understand. Also, four images are synthesized in the present embodiment, but the number of images to be synthesized is not limited to this, and, for example, can be determined according to the number of fixed cameras.

The four fixed cameras 105 of the multi-view camera 101 are arranged at intervals in the circumferential direction. Accordingly, in between the individual pickup region 205b of the fixed camera 105b and the individual pickup region 205c of the adjacent fixed camera 105c, a blind region 204 appears close to the monitoring camera unit 106 and an overlap region 203 appears farther away. The blind region 204 and the overlap region 203 exist along a boundary 202 between the individual pickup regions 205b and 205c, which are adjacent.

FIG. 3B is a schematic diagram of the photographic subjects 201a to 201d that are picked up by the monitoring camera unit 106. In FIG. 3B, an automobile is used as an example of the photographic subjects 201a to 201d. Also, the photographic subjects 201a to 201d are arranged side-by-side along the boundary 202 between the individual pickup regions 205b and 205c that are adjacent. In the case in which the pickup region 210 is picked up by the PTZ camera 102, a PTZ panorama image is obtained as shown in FIG. 3B.

FIG. 3C is a diagram showing a multi-view panorama image 207 in a case in which the pickup region 210 is picked up by the multi-view camera 101. The multi-view panorama image 207 is obtained by synthesizing four images 212a to 212d that are obtained by the individual pickup regions being picked up by the four fixed cameras 105a to 105d. The synthesis of these images can be realized by using known image synthesis technology. In FIG. 3C, overlap and absence occurs in the images 211a to 211d of the photographic subjects 201a to 201d due to the existence of the blind region 204 and the overlap region 203. Because the photographic subject 201a is positioned in the overlap region 203, it appears in both the individual pickup regions 205b and 205c of the adjacent fixed cameras 105b and 105c. Accordingly, the photographic subject 201a is displayed as a double image (image 211a) in the multi-view panorama image 207. Because photographic subjects 201c and 201d are positioned in the blind region 204, portions thereof are absent from both of the individual pickup regions 205b and 205c of the adjacent fixed cameras 105b and 105c. Alternatively, the photographic subjects 201c and 201d are entirely absent from both of the individual pickup regions 205b and 205c. Accordingly, the multi-view panorama image 207 only shows parts of the photographic subjects 201c and 201d (the image 211c and the image 211d), and not the entirety thereof.

Returning to FIG. 2, the comparing unit 129 identifies, from within the PTZ image that is the reference, a portion not included in the multi-view panorama image 207 that shows the same pickup region 210 (hereafter referred to as the absence portion), and a portion that appears redundantly (hereafter referred to as the overlap portion). As stated above, the absence portion corresponds to the blind region 204, and the overlap portion corresponds to the overlap region 203.

The comparing unit 129 includes a sub region extraction unit 107, a pixel value comparing unit 108, a holding unit 109, and a difference region calculation unit 110. The sub region extraction unit 107 extracts sub regions from the multi-view panorama image 207 that was acquired by the multi-view panorama acquisition unit 127. The sub region extraction unit 107 also extracts positionally corresponding sub regions from the PTZ panorama image acquired by the PTZ panorama acquisition unit 128. The pixel value comparing unit 108 compares the pixel values of the two extracted sub regions. The holding unit 109 holds the comparison results. After the above sub region comparison has been repeatedly performed for the entire multi-view panorama image, the difference region calculation unit 110 calculates overlap portions and absence portions.

Figure 4E:
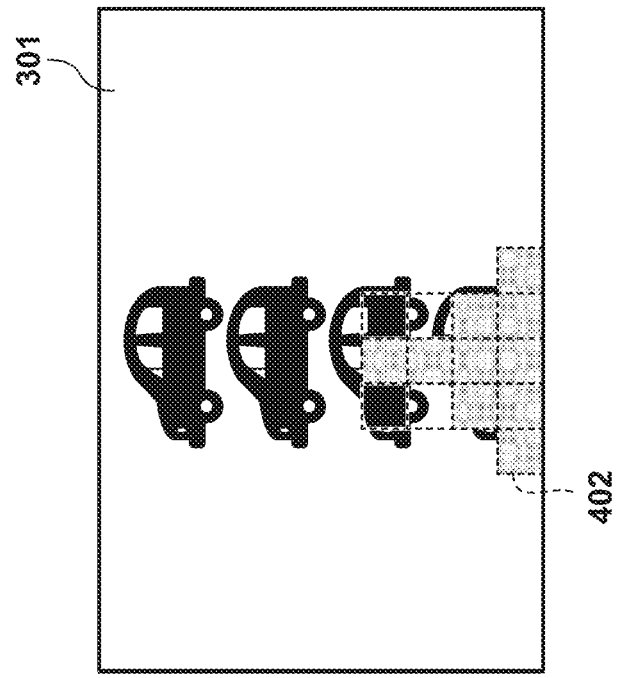
FIG. 4E is an illustrative diagram showing a method of generating the overlap portions and absence portions.
Figure 4D:
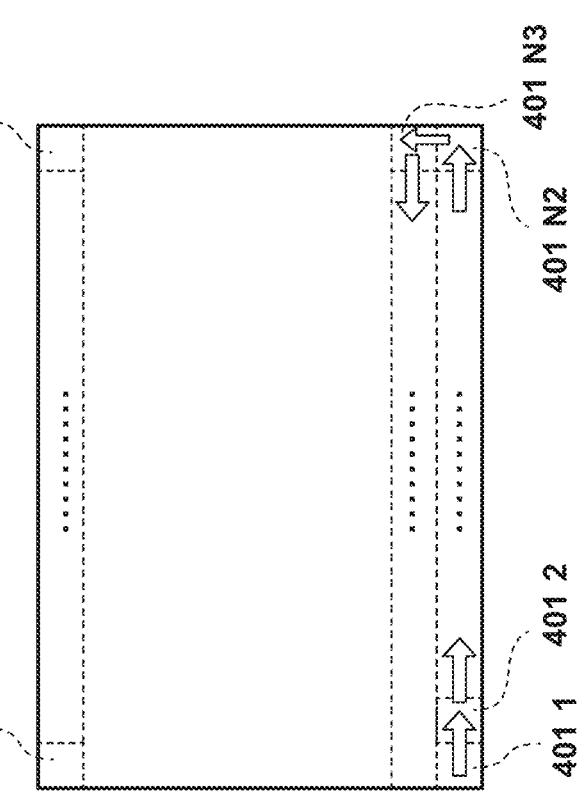
FIG. 4D is a schematic diagram showing an order in which the determining of the overlap portions and absence portions is performed.

The following describes the method of calculating the overlap portions and the absence portions with reference to FIGS. 4A to 4E. FIG. 4A is a diagram showing the multi-view panorama image 207 in a case in which the pickup region 210 was picked up by the multi-view camera 101. FIG. 4A corresponds to FIG. 3C. FIG. 4B is a diagram showing a PTZ panorama image 301 in a case in which the same pickup region 210 has been picked up by the PTZ camera 102. FIG. 4C is an illustrative diagram showing the method of determining the overlap portions and the absence portions. FIG. 4D is a schematic diagram showing the order in which the determining of the overlap portions and the absence portions is performed. FIG. 4E is an illustrative diagram showing a method of generating the overlap portions and the absence portions.

The comparing unit 129 performs a comparison between the multi-view panorama image 207 and the PTZ panorama image 301 for each predetermined sub region 401. The comparing unit 129 determines that overlap or absence has occurred if the difference between the pixel values of the sub region 401 is greater than or equal to a threshold value, and determines that overlap and absence have not occurred if the difference between the pixel values is lower than the threshold value. For example, as shown in FIG. 4C, the comparing unit 129 compares the pixel values in a sub region 401-1, determines that overlap and absence have not occurred because the difference between the pixel values is lower than the threshold value. Also, the comparing unit 129 performs the comparison in a sub region 401-N1, and determines that overlap or absence has occurred because the difference between the pixel values is greater than or equal to the threshold value. Note that, the difference between pixel values may be the average difference between the pixel values of the pixels included in the sub region, or it may be the number of or the ratio of pixels that have matching (or non-matching) pixel values in the sub region.

The determination of overlap/absence is performed sequentially by moving the sub region 401 as shown in FIG. 4D. The initial position of the sub region 401 is the bottom left of the images (the sub region at the initial position is shown as sub region 401-1), and the comparing processing moves to the sub region 401-2, which is adjacent on the right after the comparison of sub region 401-1 is complete. Then, after the sub region 401-N2 at the right end is reached, the comparing processing moves to the above sub region 401-N3, and then moves leftward as the processing continues in a similar manner. When the top left sub region 401-N4 or the top right sub region 401-N5 is reached, the comparing unit 129 ends the determining processing. When the determining processing has ended for all of the sub regions, the difference region calculation unit 110 calculates an overlap portion and an absence portion by combining the results of the determining, as shown in FIG. 4E. In the example in FIG. 4E, the difference region calculation unit 110 calculates an absence portion 402 in the PTZ panorama image 301.

Figure 5:
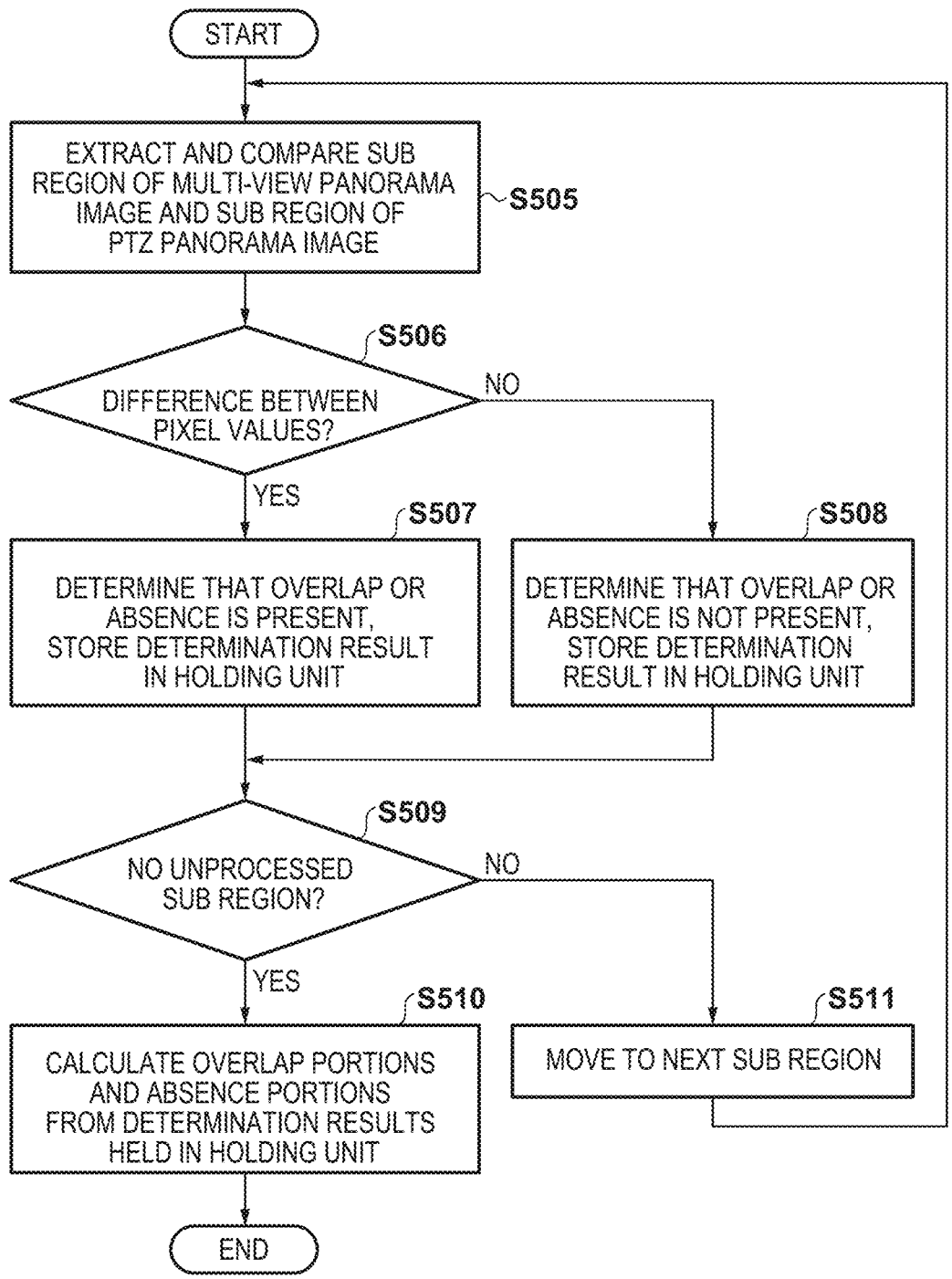
FIG. 5 is a flowchart showing a flow of a series of processing of a comparing unit in FIG. 2.

FIG. 5 is a flowchart showing the flow of a series of processing in the comparing unit 129. First, in step S505, the comparing unit 129 extracts and compares the sub region 401 of the multi-view panorama image 207 and the sub region 401 of the PTZ panorama image 301. In step S506, the comparing unit 129 determines the magnitude relation between the pixel value difference and the threshold value. In the case in which the difference is greater than or equal to the threshold value, in step S507, the comparing unit 129 determines that there is overlap/absence in that sub region 401, and stores the position of that sub region 401 and the result of the determination in correspondence in the holding unit 109. The result of the determination may be, for example, indicated by a flag that shows the presence or absence of overlap/absence. In the case in which the difference is lower than the threshold value, in step S508, the comparing unit 129 determines that there is no overlap/absence in that sub region 401, and stores the position of that sub region 401 and the result of the determination in correspondence in the holding unit 109. Then, in step S509, the comparing unit 129 determines whether there is no sub region 401 that has not been processed. In the case in which there is a sub region that has not been processed, in step S511, the comparing unit 129 moves to the next sub region 401, and processing returns to step S505. In the case in which it is determined that there is no sub region 401 that has not been processed in step S509, in step S510, the comparing unit 129 reads out the determination results of the sub regions 401 from the holding unit 109, and calculates overlap portions and absence portions.

Returning to FIG. 2, the display control unit 130 functions as an output unit that outputs the comparison result obtained by the comparing unit 129. The display control unit 130 displays the PTZ panorama image 301 together with a difference indicator that indicates the difference identified by the comparing unit 129 on the display 104 via the network 120. The difference indicator includes an absence indicator, which shows an absence portion 402 that was calculated by the difference region calculation unit 110, and an overlap indicator that shows the overlap portions calculated by the difference region calculation unit 110.

Figure 6A:
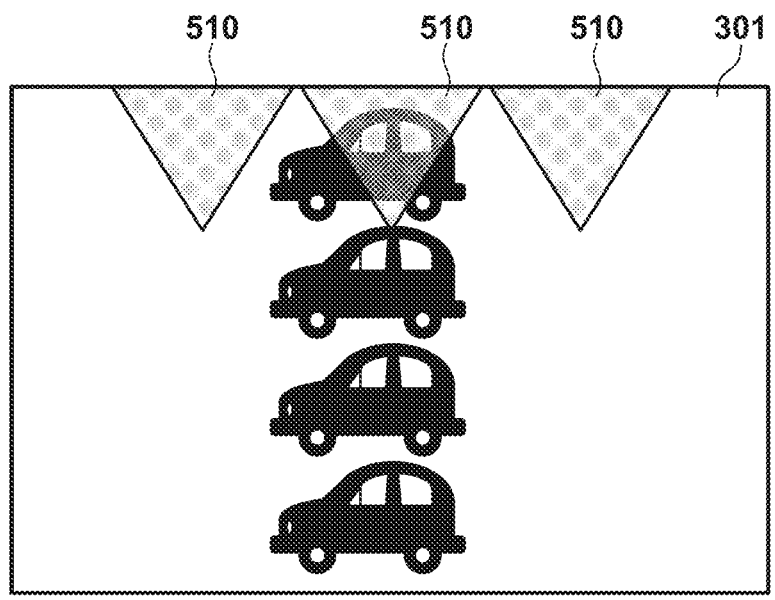
FIGS. 6A and 6B are diagrams showing a PTZ panorama image that is accompanied by an overlap indicator, and an absence indicator and is displayed on a display.
Figure 6B:
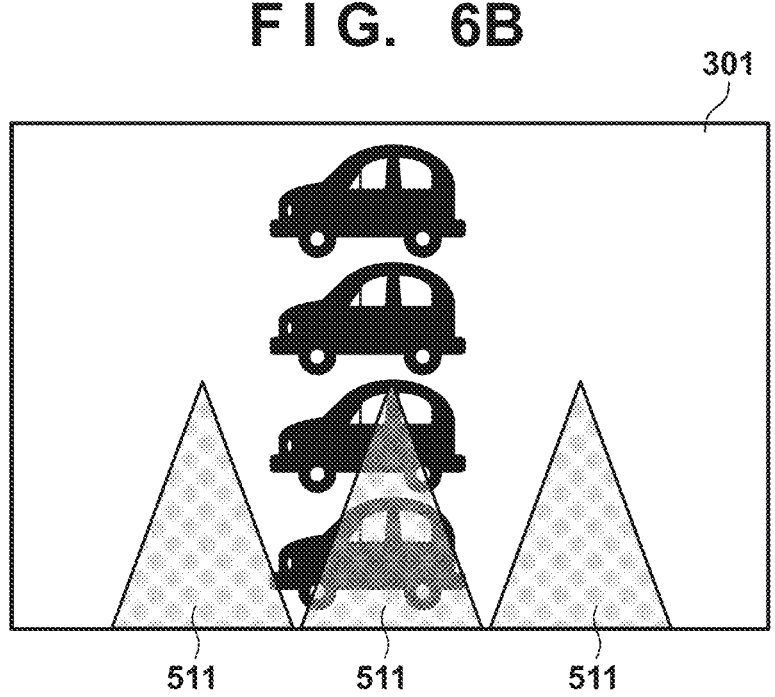

FIG. 6A is a diagram that shows the PTZ panorama image 301 that is accompanied by an overlap indicator 510 and is displayed on the display 104. FIG. 6B is a diagram that shows the PTZ panorama image 301 that is accompanied by an absence indicator 511 and is displayed on the display 104. The PTZ panorama image 301, unlike the multi-view panorama image 207, can display the photographic subject 201 without overlap or absence. For this reason, by superimposing the overlap indicator 510 and the absence indicator 511 on the PTZ panorama image 301, it is possible to recognize the positional relationship between the photographic subject 201 and the overlap region 203 or the blind region 204.

Returning to FIG. 2, the operation accepting unit 131 accepts instructions from the user made on the operating unit 901 to move the overlap indicator 510 or the absence indicator 511, from the operating unit 901 via the network 120. The display control unit 130 moves the overlap indicator 510 or the absence indicator 511 over the PTZ panorama image 301 (reference image) displayed in the display 104 according to the accepted instructions. The user can use the operating unit 901 to move the displayed overlap indicator 510 or the absence indicator 511 over the PTZ panorama image 301. The rotation amount calculation unit 902 calculates an amount of motion of the housing 122 that is to accompany the movement of the overlap indicator 510 or the absence indicator 511. The amount of motion is, for example, the rotation angle of the housing 122 that is necessary in order to actually move the overlap region 203 or the blind region 204.

Figure 7A:
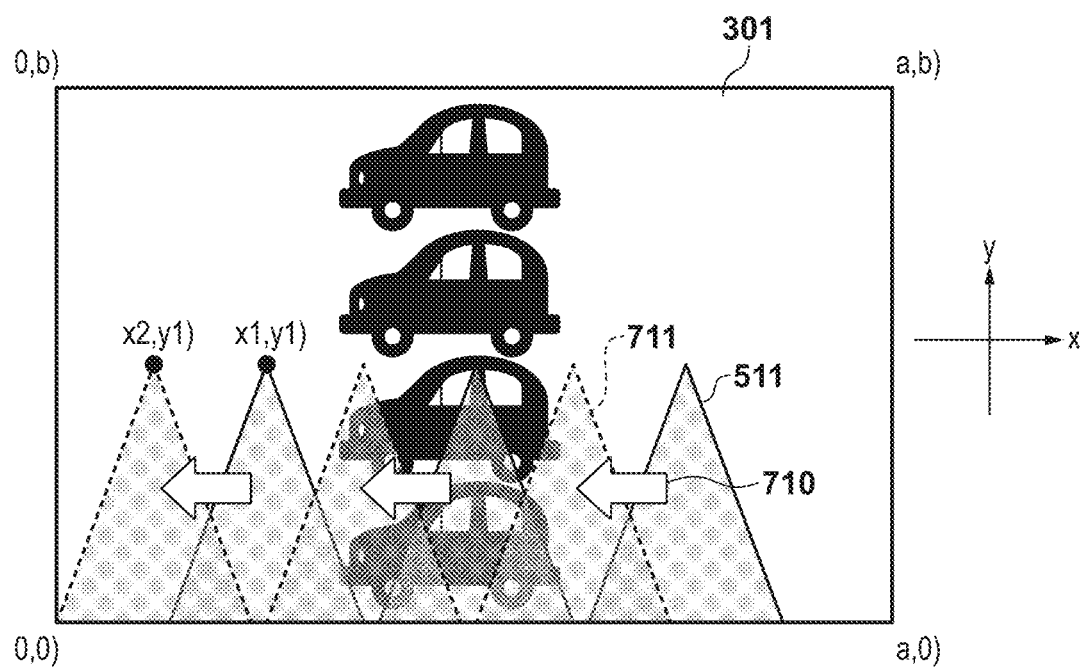
FIG. 7A is a diagram showing an absence indicator before moving and an absence indicator after moving.
Figure 7B:
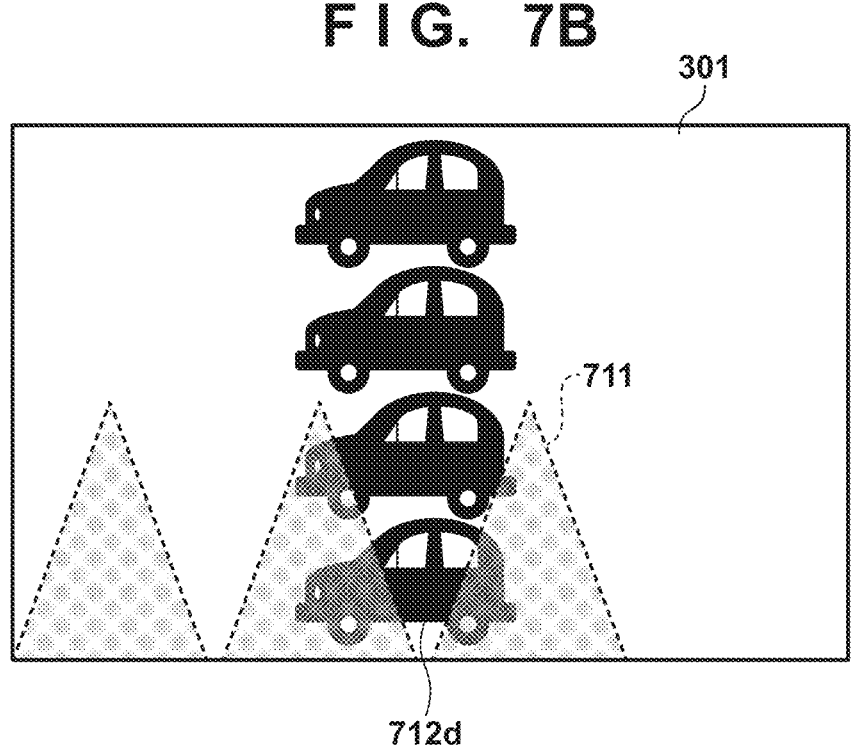
FIG. 7B is a diagram showing a PTZ panorama image that is accompanied by an absence indicator after moving.

The following describes the movement of the absence indicator 511 with reference to FIGS. 7A and 7B. As an example, consider a case in which the absence indicator 511 is moved in the direction of an arrow 710 (leftward) on the PTZ panorama image 301 that displays the absence indicator 511. FIG. 7A is a diagram that shows the unmoved absence indicator 511 and a moved absence indicator 711. In FIG. 7A, the unmoved absence indicator 511 has a solid line as an outline and the moved absence indicator 711 has a dashed line as an outline, but the actual display mode is not limited to this.

FIG. 7B is a diagram showing the PTZ panorama image 301 accompanied by the moved absence indicator 711. The absence indicator moves over the PTZ panorama image 301, but, at that time, the position of the corresponding blind region 204 has not yet moved. FIG. 7B shows the result of a simulation of rotating the monitoring camera unit 106. For this reason, the display control unit 130 may display the moved absence indicator 711 in a mode different from the unmoved absence indicator 511. For example, in the example shown in FIG. 7B, the moved absence indicator 711 is displayed as having a dashed line as an outline.

When the absence indicator 511 is moved over the PTZ panorama image 301, which is displayed on the display 104, according to the instructions from the user, a part of the PTZ panorama image 301 that was concealed by the absence indicator 511 before being moved appears. For example, in the state shown in FIG. 7A, the window portion of an image 712d of a photographic subject 201d that is closest to the monitoring camera unit 106 is concealed by the absence indicator 511. In the state shown in FIG. 7B, that window portion is visible after the absence indicator 511 has been moved. In this way, the image that was concealed under that absence indicator appears due to movement of the absence indicator, and, therefore, the user can easily know to what extent and in what manner they need to move the absence indicator in order for the object of interest to be visible.

The following is a description of a method of calculating a rotation angle in the rotation amount calculation unit 902, with reference to FIG. 7A. For example, consider a case when the absence indicator 511 is moved, as shown in FIG. 7A. In FIG. 7A, the following coordinates are assigned to the PTZ panorama image 301: (0,0) to the lower left, (a,0) to the lower right, (0,b) to the upper left, (a,b) to the upper right, (x1,y1) to the top of the unmoved absence indicator 511, and (x2,y1) to the top of the moved absence indicator 711. Note that coordinates are assigned in correspondence with the sub regions 401 used at the time of calculation of overlap portions and absence portions. The horizontal direction in FIG. 7A is the x direction, and the vertical direction is they direction. The rotation angle of the monitoring camera unit 106 (or its housing 122) relative to a movement amount in the x direction is calculated by Formula (1) shown below. Here, α is the angular range corresponding to the PTZ panorama image 301. For example, in the case in which an omnidirectional PTZ panorama image 301 is generated, α=360 degrees.

$$\text{rotation angle relative to movement} = (x2-x1) \times (\alpha \div a) \quad (1)$$

FIG. 8 is a flowchart that shows the flow of a series of processing in the rotation amount calculation unit 902. First, in step S801, the rotation amount calculation unit 902 acquires the angular range (α) corresponding to the PTZ panorama image 301. For example, the angular range is 0 degrees to 360 degrees in the case in which an omnidirectional PTZ panorama image 301 is generated. Next, in step S802, the rotation amount calculation unit 902 acquires the coordinates (a,b) of the end of the PTZ panorama image 301 and the coordinates (x1, y1) of the top of the unmoved absence indicator 511. After the coordinate acquisition, in step S803, the user uses the operating unit 901 to move the absence indicator. In step S804, the rotation amount calculation unit 902 calculates the coordinates (x2,y1) of the top of the moved absence indicator 711. In step S805, the rotation amount calculation unit 902 uses Formula (1) to calculate the rotation angle necessary to move the absence indicator. In step S806, the rotation amount calculation unit 902 notifies the user of the calculated rotation angle. The notification may be given by displaying the rotation angle on the display 104 via the display control unit 130, or by synthesizing and outputting audio indicating the rotation angle.

Returning to FIG. 2, the multi-view panorama complementing unit 601 complements the multi-view panorama image 207 based on the comparison result from the comparing unit 129. The multi-view panorama complementing unit 601 complements the multi-view panorama image 207 in accordance with the absence portion 402 calculated by the comparing unit 129. Because the multi-view panorama image 207 has different absences from the PTZ panorama image 301, unpleasantness can be reduced by adjusting the multi-view panorama image 207 so as to complement the absence portion 402. The display control unit 130 displays, on the display 104, the multi-view panorama image that has been complemented by the multi-view panorama complementing unit 601.

Figure 9A:
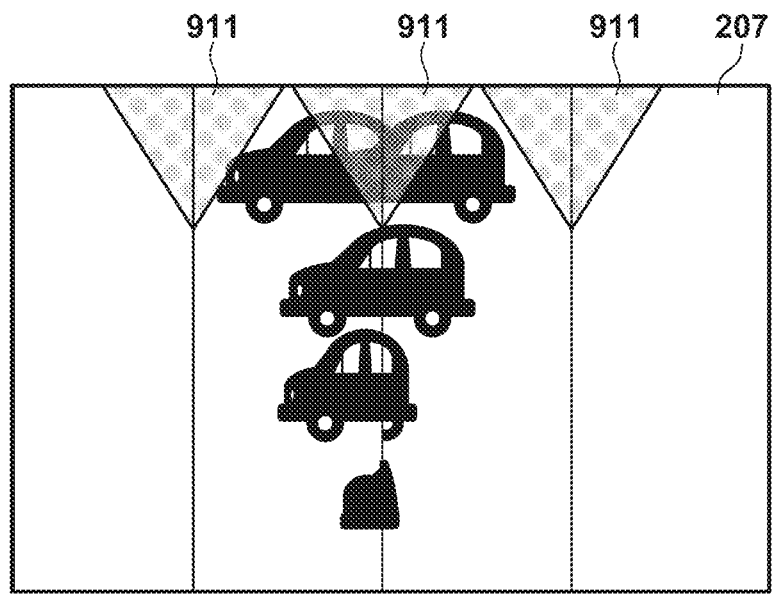
FIG. 9A is a diagram showing a multi-view panorama image that is accompanied by an overlap indicator and is displayed on a display.
Figure 9B:
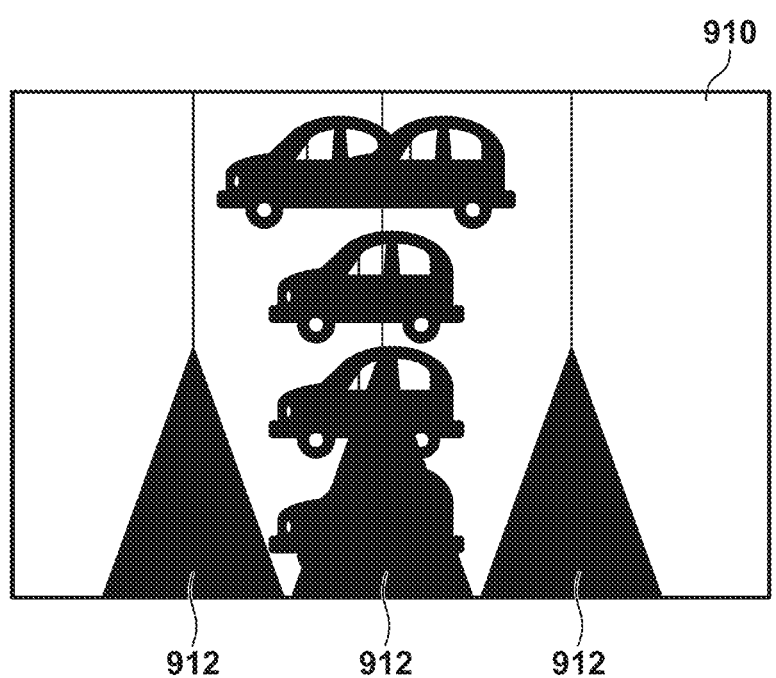
FIG. 9B is a diagram showing a complemented multi-view image that is accompanied by an absence indicator and is displayed on a display.

FIG. 9A is a diagram showing the multi-view panorama image 207 that is accompanied by overlap indicators 911 and is displayed on the display 104. The overlap indicators 911 show the overlap portions calculated by the difference region calculation unit 110. FIG. 9B is a diagram showing a complemented multi-view image 910 that is accompanied by absence indicators 912 and is displayed on the display 104. The absence indicators 912 show the absence portions 402 calculated by the difference region calculation unit 110. The multi-view panorama complementing unit 601 generates the complemented multi-view image 910 by inserting the absence indicators 912 into the multi-view panorama image 207.

The operation of the monitoring camera unit 106 having the above configuration unit will be described below.

Figure 10:
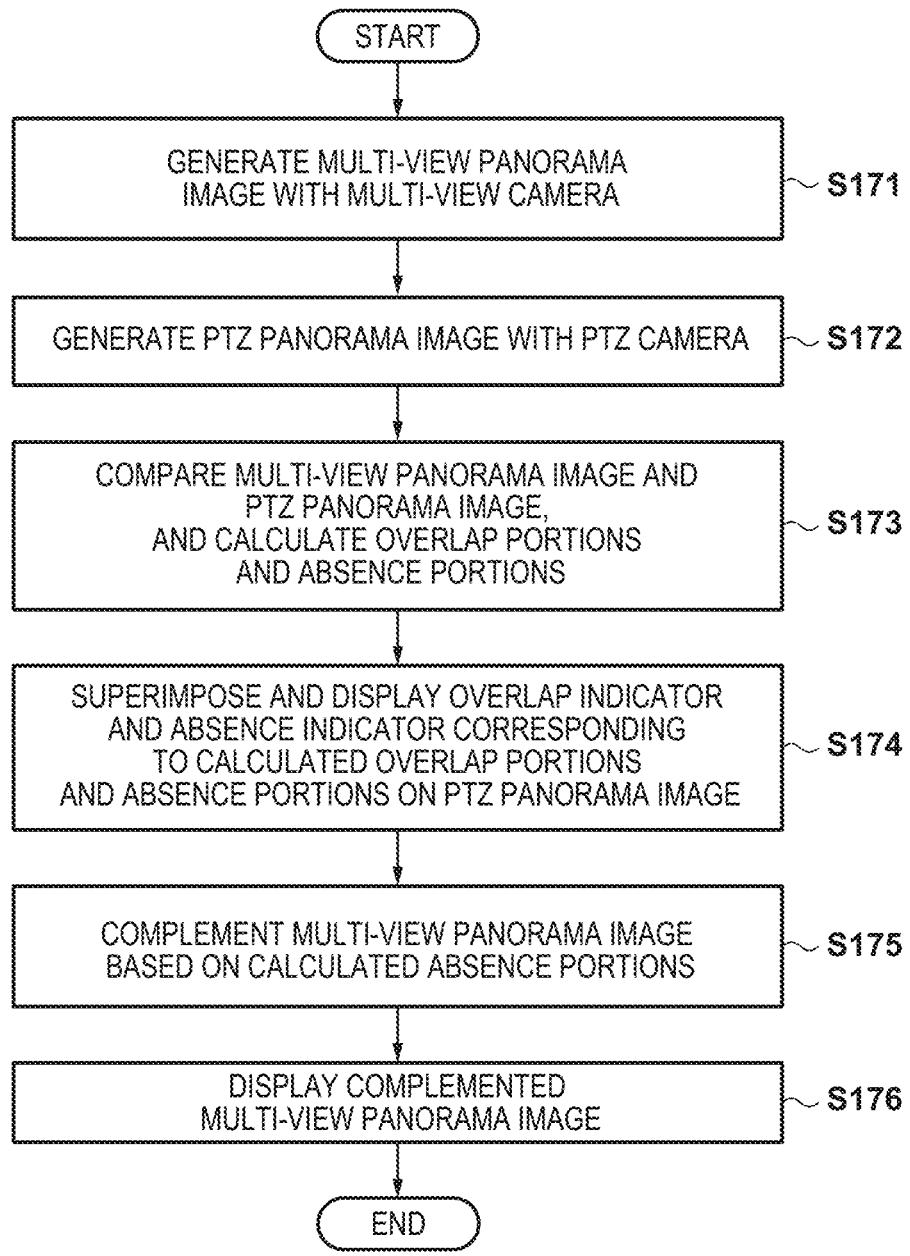
FIG. 10 is a flowchart showing a flow of a series of processing in the monitoring camera unit of FIG. 1.

FIG. 10 is a flowchart showing the flow of a series of processing in the monitoring camera unit 106. First, in step S171, the monitoring camera unit 106 uses the multi-view camera 101 to generate the multi-view panorama image 207. In step S172, the monitoring camera unit 106 use the pan/tilt/zoom functions of the PTZ camera 102 to scan a wide area and generate the PTZ panorama image 301 by, for example, turning the PTZ camera 102. In step S173, the monitoring camera unit 106 compares the multi-view panorama image 207 and the PTZ panorama image 301, and calculates the overlap portions and the absence portions. After the calculation, in step S174, the monitoring camera unit 106 superimposes the overlap indicator and the absence indicator that correspond to the calculated overlap portions and absence portions onto the PTZ panorama image 301, and displays the image on the display 104. In step S175, the monitoring camera unit 106 complements the multi-view panorama image 207 based on the calculated absence portions. In step S176, the monitoring camera unit 106 displays the complemented multi-view panorama image (the complemented multi-view image) on the display 104.

FIG. 11 is a flowchart showing the procedure when the installer adjusts the orientation of the monitoring camera unit 106. In step S180, the installer installs the monitoring camera unit 106 at a desired position. In step S181, the installer checks the way in which an object of interest is included in the pickup region 210 by using the display 104 of the workstation 121. In step S182, the installer determines whether or not the object of interest is concealed by the difference indicators (the overlap indicator or the absence indicator, for example). If there is no concealment, the installation is complete. If there is concealment, in step S183, the installer moves the difference indicators such that the object of interest appears in the PTZ panorama image 301 displayed on the display 104. For example, the installer moves the difference indicators by operating the operating unit 901 such that the object of interest deviates from the difference indicators. In step S184, the installer receives a notification of a rotation angle that corresponds to the movement amount from the monitoring camera unit 106 or the workstation 121. In step S185, the installer rotates the entire monitoring camera unit 106 such that the rotation angle of the notification is realized.

According to the monitoring camera unit 106 of the present embodiment, it becomes easier to grasp the positions of the overlap portions and the absence portions in the multi-view panorama image 207, and, therefore, it is possible to easily grasp the positional relationship between the photographic subject 201 and the overlap regions 203 or the blind regions 204. Through this, it becomes even easier to install the monitoring camera unit 106 with consideration given to the positional relationship. For example, in the case in which there is a photographic subject that is desired to be observed at the time of installation of the monitoring camera unit 106, it is possible to install the monitoring camera unit 106 such that the overlap regions 203 and the blind regions 204 deviate from that photographic subject.

The configuration and operation of the monitoring camera unit 106 according to the present embodiment have been described above. This embodiment is illustrative, and it would be understood by a person skilled in the art that various variations can be made by combinations of constituent elements and processing steps, and that such variations are also encompassed in the scope of the present invention.

In the present embodiment, the case in which the absence indicator 511 is translated in the x direction is described, but there is no limitation to this. Another mode of display movement is also possible. For example, the absence indicator 511 may be moved in the y direction.

In the present embodiment, the case in which the PTZ camera 102 is used as an image-capturing unit for generating a reference image is described, but there is no limitation to this. For example, it is possible to use a camera that has a wider angle of view than the fixed camera 105, such as a camera including a fisheye lens (a fisheye camera).

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   a first acquisition unit configured to acquire a first image that is obtained by synthesizing a plurality of images captured by a plurality of first image-capturing units, wherein the plurality of first image-capturing units respectively capture a different one of a plurality of regions in a monitoring area;
   a second acquisition unit configured to acquire a second image that is obtained by a plurality of images captured by a second image-capturing unit that captures the monitoring area by turning the second image-capturing unit in at least one of a tilt direction and a pan direction;
   a comparing unit configured to compare the first image and the second image to identify, on a boundary between the capturing regions of the plurality of the first image-capturing units, at least one of a first region that cannot be captured by the plurality of the first image-capturing units and a second region that is captured redundantly by the plurality of the first image-capturing units; and
   an output unit configured to output information indicating at least one of the first region and the second region based on a comparison result by the comparing unit.

2. The image processing apparatus according to claim 1, wherein the comparing unit identifies a difference between the first image and the second image.

3. The image processing apparatus according to claim 2, wherein the output unit displays the second image together with an indicator that shows the difference on a display unit.

4. The image processing apparatus according to claim 3, further comprising an accepting unit configured to accept an instruction for moving the indicator showing the difference, wherein the output unit moves the indicator showing the difference according to the instruction on the second image displayed on the display unit.

5. The image processing apparatus according to claim 4, further comprising a calculation unit configured to calculate an amount of motion of a housing of the image processing apparatus that is to accompany movement of the indicator showing the difference.

6. The image processing apparatus according to claim 4, wherein, if the indicator showing the difference is moved according to the instruction on the second image displayed on the display unit, a portion of the second image appears, the portion having been concealed by the indicator showing the difference before movement.

7. The image processing apparatus according to claim 1, further comprising a complementing unit configured to complement the first image based on the comparison result from the comparing unit,
   wherein the output unit displays the complemented first image on the display unit.

8. The image processing apparatus according to claim 1, wherein the second image-capturing unit is provided in a housing in which the plurality of first image-capturing units are provided.

9. The image processing apparatus according to claim 8, wherein each of the plurality of first image-capturing units is fixed to the housing, and the second image-capturing unit is configured to be capable of moving relative to the housing.

10. The image processing apparatus according to claim 1, further comprising a superimposing unit configured to superimpose at a least one of an image indicating the first region and an image indicating the second region on the second image.

11. The image processing apparatus according to claim 1, further comprising a superimposing unit configured to superimpose at a least one of an image indicating the first region and an image indicating the second region on the first image.

12. A non-transitory computer-readable storage medium storing a computer program for causing a computer to execute a method, the method comprising:
   installing an image-capturing apparatus comprising a plurality of first image-capturing units and a second image-capturing unit;
   moving an indicator on a reference image that is from the second image-capturing unit and is displayed on a display unit together with the indicator, the indicator showing a difference between the reference image and a synthesized image obtained by synthesizing a plurality of images from the plurality of first image-capturing units, the indicator being moved such that an object of interest deviates from the difference; and
   adjusting an orientation of the image-capturing apparatus in accordance with an amount of the movement.

13. A method comprising:
   installing an image-capturing apparatus comprising a plurality of first image-capturing units and a second image-capturing unit;
   moving an indicator on a reference image that is from the second image-capturing unit and is displayed on a display unit together with the indicator, the indicator showing a difference between the reference image and a synthesized image obtained by synthesizing a plurality of images from the plurality of first image-capturing units, the indicator being moved such that an object of interest deviates from the difference; and adjusting an orientation of the image-capturing apparatus in accordance with an amount of the movement.

\* \* \* \* \*